United States Patent

[11] 3,620,760

| [72] | Inventors | Melvin A. Ver Steeg, Jr.;<br>Ferdinand E. Spring, Jr., both of St. Louis, Mo. |
|---|---|---|
| [21] | Appl. No. | 778,478 |
| [22] | Filed | Nov. 25, 1968 |
| [45] | Patented | Nov. 16, 1971 |
| [73] | Assignee | Ralston Purina Company<br>Saint Louis, Mo. |

[54] COOK-IN-THE-BOWL CEREAL
6 Claims, 1 Drawing Fig.

| [52] | U.S. Cl. | 99/80 |
|---|---|---|
| [51] | Int. Cl. | A23l 1/10 |
| [50] | Field of Search | 99/80, 80 PS, 83 |

[56] References Cited
UNITED STATES PATENTS

| 2,864,702 | 12/1958 | Murray et al. | 99/80 |
|---|---|---|---|
| 2,898,210 | 8/1959 | Dale et al. | 99/80 |
| 2,928,743 | 3/1960 | Rutgers | 99/80 |
| 2,930,697 | 3/1960 | Miller | 99/80 |
| 3,241,978 | 3/1966 | Hreschack | 99/80 |

*Primary Examiner*—Raymond N. Jones
*Attorneys*—Robert W. Brukardt and Edward H. Renner ABSTRACT: A process of producing a cook-in-the-bowl type of hot breakfast cereal is disclosed. The process involves selecting a specific milled fraction of grain and flaking the grain to a thickness of 0.010 to 0.012 inch. The thin flakes are capable of rehydrating rapidly in boiling water to produce a hot breakfast cereal of the instant or cook-in-the-bowl type.

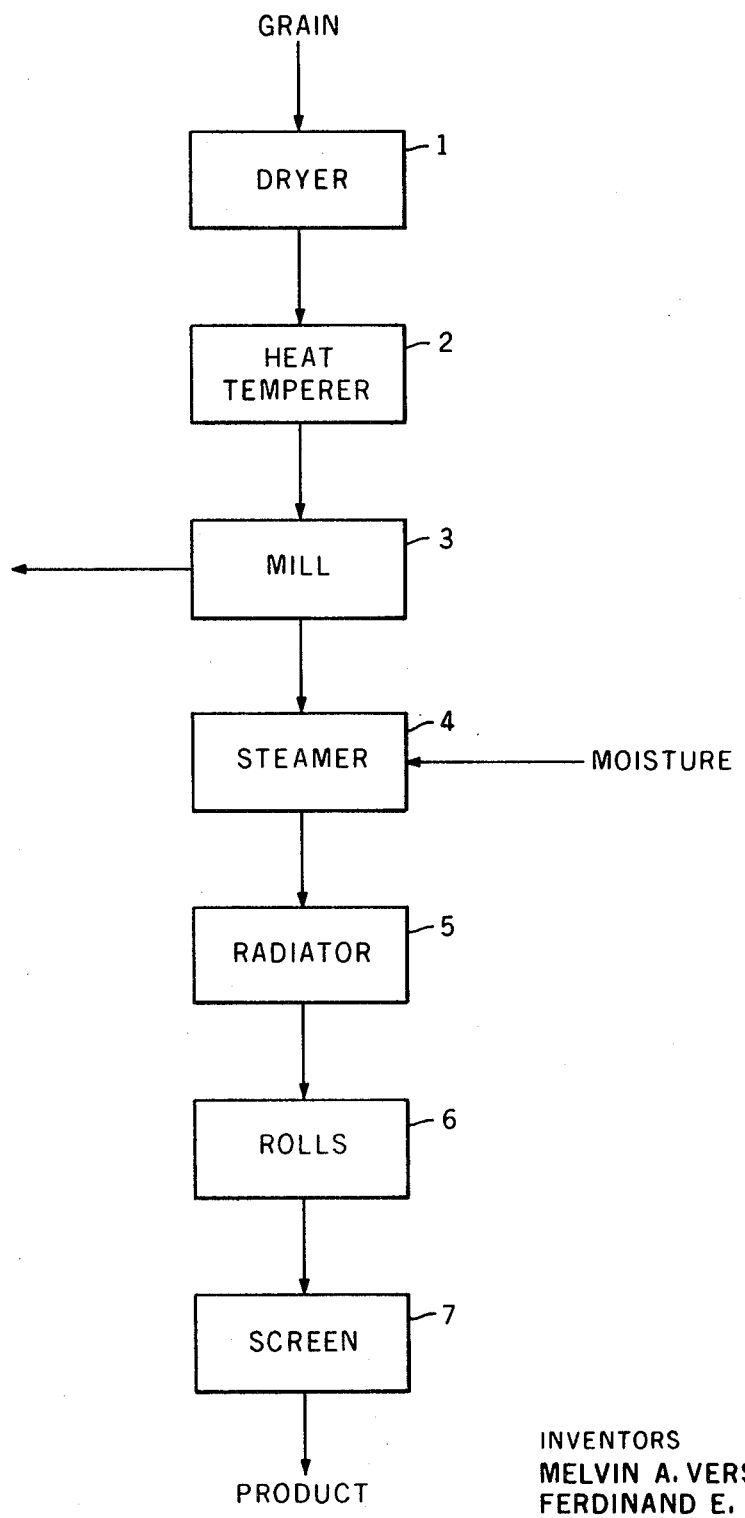

COOK-IN-THE-BOWL CEREAL

It is known in the art to produce quick-cooking hot breakfast cereals from grain. The known processes usually employ steaming the grain particles at elevated temperatures and pressures and flaking the grain particles to form a cereal product that can be prepared for use by the consumer by boiling in water from 1 to 2 minutes. Examples of this type are taught by U.S. Pat. Nos. 2,332,914 and 3,241,978. It is also known to incorporate edible gums in conventional hot cereal products to decrease the time required to prepare them for consumption or to provide an instant or cook-in-the-bowl-type cereal. U.S. Pat. Nos. 2,890,118 and 2,999,018 disclose cereal products of this type.

This invention provides a process for producing a novel cook-in-the-bowl or instant-type cereal which does not require edible gums to decrease the time of preparation and which can be prepared in a cereal bowl by adding boiling water. The product has the distinct advantage of not requiring an additive material to decrease the time required for preparation. Added materials dilute the basic nutrient material and do not add any additional nutrient properties to the cereal product. The process of this invention produces a cook-in-the-bowl type of cereal which is undiluted and retains the nutritional properties of the grain intact. The process can be accomplished in an economical, continuous, plant-scale operation. The product of this invention is a novel cook-in-the-bowl cereal which has superior taste and texture, and the nutritional properties of the undiluted grain. When cooked in a cereal bowl by adding boiling water the product provides a hot breakfast cereal which is prepared instantly and which has a taste and texture equivalent or superior to slow-cooking hot cereal.

The invention involves selecting a particular milled fraction of grain and flaking the grain to a very thin flake of 0.010 to 0.012 inch thickness. Oats, or preferably steel-cut oat groats, are milled to particle size such that about 90 percent of the milled grain passes a No. 8 Tyler mesh screen and less than about 8 percent passes a no. 12 Tyler mesh screen. The milled fraction is tempered to a moisture content of 12 to 16 percent and a temperature of 185°–220° F. before being flaked. The tempered grain is then passed through a set of flaking rolls having a slight speed differential and flaked to 0.010 to 0.012 inch. The flaked grain is dried to provide a rapidly rehydrating flake, e.g., from 10 to 12 percent moisture by weight.

It is critical that the thickness of the flake be controlled to produce a flake of 0.010 to 0.012 inch thickness. At thicknesses above 0.012 inch the flake will not rehydrate satisfactorily to produce a cook-in-the-bowl product. The cereal will have a mealy mouth feel, uncooked flavor and will not absorb excess water. At thicknesses below 0.010 inch the flakes are too fragile and readily break up to a fine dust or powder which rehydrates to a paste or mush. Control of the moisture content and temperature of the grain fraction is essential to producing a flake of the desired thickness.

A process of producing a cook-in-the-bowl cereal product is illustrated in the drawings. Whole, cleansed oats having a moisture content of about 11 percent by weight are conducted through a dryer 1 which is maintained at a temperature of about 220° F. The oats are dried to a moisture content of about 7 to 8 percent by weight. The dried oats are then conducted to a heat temperer 2 where they are held for 8 to 12 hours at a temperature of about 220° F. The oats are then cooled to about 80° F. and conducted through a conventional milling operation 3. From the milling operation a fraction of steel-cut oat groats is selected which has about 90 percent of the particle size greater than No. 12 Tyler mesh. The grain fraction used in the process shown by the drawing is preferably selected to conform to the screen analysis shown by table I.

TABLE I

| Tyler Mesh Screen Size | Percent of Particles Retained on Screen |
| --- | --- |
| No. 6 | 0 |
| No. 8 | 10 |
| No. 12 | 82½ |
| No. 20 | 7 |
| pan | ½ |

The milled fraction normally has a moisture content of about 7 to 8 percent by weight. This is too low for proper rolling. The milled groats are conducted to a steamer 4 where steam at about 11 p.s.i.g. and 220° F. is injected into the grain mass. The grain is retained in the steamer for about five minutes to allow the grain to adsorb moisture and heat. After the steamed grain leaves the steamer it passes through a radiator 5 which is maintained at between 250°–260° F. to drive the moisture into the grain particles. The grain is then conducted to the flaking rolls 6. At this point the moisture content of the grain to the rolls should be about 12 to 16 percent by weight and the temperature should be 185°–220° F. The moisture content must be carefully controlled to enable the grain to be rolled to the proper thickness. To provide a rapidly rehydrating product the rolled flakes must be very thin and durable. Preferably the temperature of the grain should be controlled to the range of 190° to 210° F. The tempered grain is fed through the 14-inches ×36-inches water-cooled 30-horsepower Lauhoff rolls 6 having a speed differential of 9 to 10 and set to flake the grain to between 0.010 and 0.012 inch thickness. The rolled product is then sifted on screen 7 to remove any lumps which have formed on the rolls 6. The screened product can then be packaged and sold or processed further. At this point about 80 percent of the particles should have a screen size greater than No. 10 U.S. standard sieve. Preferably, the screen analysis of the flakes should fall within the ranges given by table II to provide product which rehydrates without pastiness or mealiness. The final product has a moisture content after rolling of about 10 to 12 percent by weight.

TABLE II

| U.S. Standard Sieve Size | percent of Particles Retained on Sieve |
| --- | --- |
| No. 4 | 8–12 |
| No. 10 | 70–75 |
| No. 16 | 9–13 |
| pan | 6–10 |

A dried, screened product produced as described above was lightly salted by adding about 2 percent by weight salt and was rehydrated by adding two-thirds cup of boiling water to 36 grams of the flakes in a cereal bowl. The product rehydrated rapidly to produce an oatmeal-type breakfast cereal having a pleasing texture and mouth feel, and a flavor which was judged to be of superior quality. The rehydrated cereal was not mealy, pasty, or slimy in taste and appearance.

The product can be packaged and sold as produced by the above process, it can be combined with a number of flavoring agents, or it can be combined with other cereal ingredients to provide a convenient cook-in-the-bowl product. A particular advantage can be obtained by combining the cook-in-the-bowl oat product with other cook-in-the-bowl cereal grains, such as wheat flakes. It is possible to supplement the nutritional value of the oat flakes by adding wheat flakes or other materials to the oat cereal. Wheat has a high niacin content, for example, and oats do not. Combining wheat flakes with oat flakes improves the niacin content of the cereal product. Tables III and IV show formulations of combined cook-in-the-bowl cereals.

Normally, the combined cereals are mixed in the dry state and packaged. The dry mixture has a moisture content of about 10 percent by weight.

TABLE III

| Ingredient | % |
| --- | --- |
| Oat Flakes | 83 |
| Wheat Flakes | 15 |
| Salt | 2 |
| | 100 |

TABLE IV

| Ingredient | % |
| --- | --- |
| Oat Flakes | 68 |
| Wheat Flakes | 30 |
| Salt | 2 |
| | 100 |

I claim:

1. A method of producing an instant cook-in-the-bowl type of breakfast cereal from oats which has a rapid rate of rehydration and convenient preparation with a taste equivalent or superior to slow-cooking breakfast cereals comprising:
   a. milling the oats,
   b. screening the milled oats to produce a fraction with about 90 percent of the milled oats having a particle size less than No. 8 Tyler mesh screen size, and less than about 8 percent of the milled oats having a particle size less than No. 12 Tyler mesh screen size,
   c. tempering the screened milled oats to a moisture content of between 12 to 16 percent by weight and a temperature of 185° to 220° F.,
   d. flaking the tempered oats to a thickness of 0.010 to 0.012 inch, and
   e. drying the flaked oats.

2. The method of claim 1 wherein the flaked oats are dried to a moisture content of about 10 to 12 percent by weight.

3. The method of claim 1 wherein about 80 percent of the flaked dry oats have a particle size greater than No. 10 U.S. standard sieve.

4. The method of claim 1 wherein the milled oats are screened to produce a product having about a following particle size distribution:

| Tyler mesh screen size | Percent of particles retained on screen |
| --- | --- |
| No. 6 | 0 |
| No. 8 | 10 |
| No. 12 | 82½ |
| No. 20 | 7 |
| pan | ½ |

5. The method of claim 1 wherein vitamins and nutritional substances are added to the flaked oats.

6. The method of claim 5 wherein a nutritional supplement is wheat.

* * * * *